350-432 SR

OR 4,099,848

United Stat

Osakabe

[11] 4,099,848

[45] Jul. 11, 1978

[54] OPTICAL CORRECTION LENS

[75] Inventor: Kuniharu Osakabe, Mobara, Japan

[73] Assignee: Hitachi, Ltd., Japan

[21] Appl. No.: 660,779

[22] Filed: Feb. 24, 1976

[30] Foreign Application Priority Data

May 30, 1975 [JP] Japan ................................ 50-64262

[51] Int. Cl.$^2$ ........................ G02B 3/04; G03B 41/00

[52] U.S. Cl. ........................................ 350/189; 354/1

[58] Field of Search ..................... 350/189, 200; 354/1

[56] References Cited

U.S. PATENT DOCUMENTS

| | | | |
|---|---|---|---|
| 2,344,756 | 3/1944 | Warmisham | 350/200 |
| 3,628,850 | 12/1971 | Yamazaki | 350/189 |
| 3,900,854 | 8/1975 | Osakabe | 354/1 |

*Primary Examiner*—Conrad J. Clark

*Attorney, Agent, or Firm*—Craig & Antonelli

[57] ABSTRACT

A correction lens disposed between the exposure light source and a glass panel provided with a shadow mask at the exposure step of manufacturing a color television CRT and adaped to compensate for the tendency of the phosphor stripes being formed in a wavy configuration. The correction lens has such a characteristic that, when the light source is observed through the correction lens at the side of the shadow mask, the light source is viewed as displaced in appearance toward the correction lens by a certain constant distance on the optical axis independently of the viewing angle, whereby the image of a linear light source or the linear moving path of a point source of light is made to extend substantially in parallel with the length of the slot of the shadow mask.

1 Claim, 6 Drawing Figures

OPTICAL CORRECTION LENS

The present invention relates to a correction lens which is effective for use in the formation of a phosphor screen particularly of a stripe type of a cathode ray tube (CRT) for a color television receiver.

The prior art and the invention as well as advantages and novel features of the latter will be described referring to the accompanying drawings in which.

Figure 1:
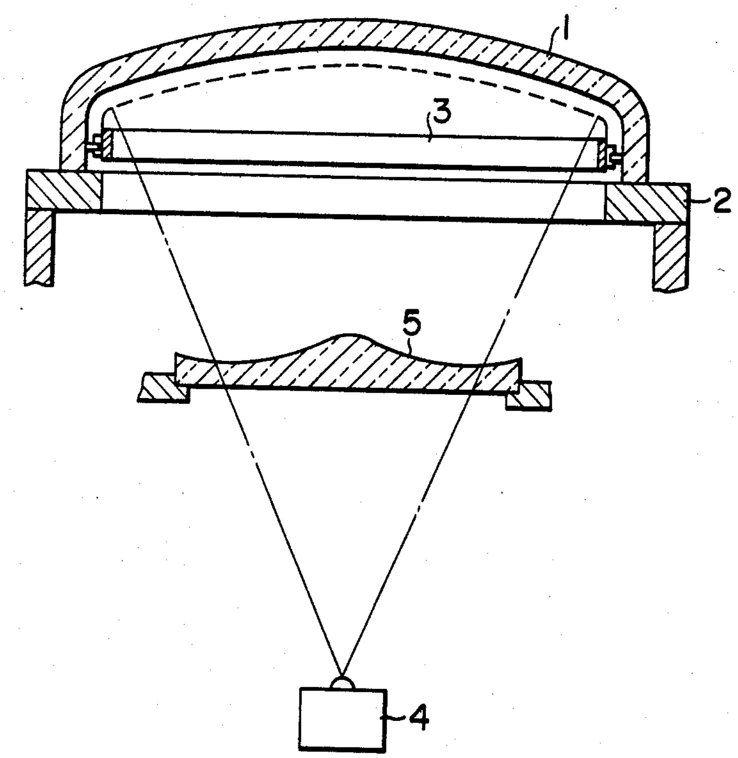
FIG. 1 PRIOR ART
FIG. 1 shows schematically a structure of a hitherto known exposure apparatus used for the formation of the phosphor screen of a color CRT.

Referring to FIG. 1 which shows a general arrangement of an exposure apparatus for forming a phosphor screen of a slot type for a color television receiver tube or CRT, reference numeral 1 indicates a glass panel having an inner surface applied with a film of a light sensitive material. The glass panel 1 is positioned in place on an exposure table 2. A color selection electrode array 3 of a slot type (hereinafter referred to simply as shadow mask) is mounted at the inner side of the glass panel 1. A exposure light source 4 is disposed below the exposure table 2 spaced from the glass panel 1 for a predetermined distance. The exposure light source 4 may be composed of a point source of exposure light adapted to be moved for a predetermined distance linearly along the longitudinal direction of the slot of the shadow mask or a linear light source having a predetermined length in the longitudinal direction of the slot. Disposed between the light source 4 and the glass panel 1 is a correction lens 5 which serves to approximate the optical path of exposure rays from the light source 4 to the path of electron beams in the color television CRT.

It is noted that the shadow mask 3 is formed with predetermined curvatures which are greater at the corner portions of the panel.

Figure 2:
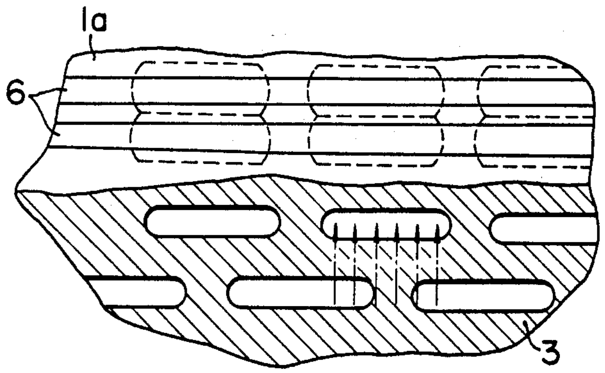
FIG. 2 illustrates an exposure condition at a middle portion of a screen panel.
Figure 3:
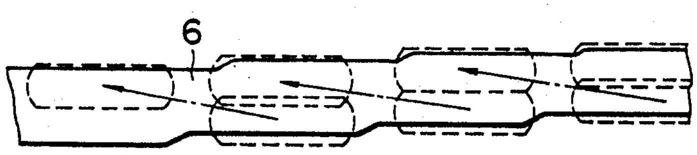
FIG. 3 illustrates the formation of wavy phosphor stripes at the corner portion of the screen panel in the hitherto known exposure process.

When the phosphor screen is formed with the aid of the exposure apparatus having a construction described above, straight and continuous phosphor stripes 6 are formed in the light sensitive film 1a of the glass panel 1 at the middle portion of the shadow mask 3, as is shown in FIG. 2. On the other hand, phosphor stripe 1*a* of a waving form will be formed at the locations of the glass panel corresponding to the corner portions of the shadow mask, as is illustrated in FIG. 3, since the phosphor stripes at these locations are formed through the slots of the shadow mask having a large curvature. FIG. 3 illustrates the phosphor stripe formed at the left upper corner of the glass panel as viewed from the side of the electron gun after having been assembled. In the figure, the broken lines represent slot images projected on the light sensitive film. When a point source of light is employed, the slot images will be displaced in the direction indicated by arrows as the point source is moved, as a result of which the regions interconnecting two adjacent slots indicated by coupling arrows are exposed. In the case where a linear light source is employed, the exposure will be performed in a similar manner except that the slot images remain immovable.

In more detail, since the longitudinal center axis of the respective slots and the moving direction of the point source of light are not included in one and the same plane at the corner portions, the slot image has necessarily a displacement component in the width or transversal direction of the slot upon the linear movement of the light source, which results in the formation of the phosphor stripe 1*a* of a wavy shape such as shown in FIG. 3. It will be self-explanatory that such phosphor stripes of wavy form will disadvantageously give rise to a color blue or mismatching upon being impinged with the electron beam. This is because the slot images formed by the electron beams on the phosphor screen will extend in the longitudinal direction of the slots formed in the shadow mask and thus can not coincidentally cover the areas of the phosphor stripes displaced in the transversal direction of the slots.

On the other hand, the slot images tend to be enlarged in width, making it difficult to obtain narrow stripes at the corner portions of the glass panel.

Accordingly, an object of the present invention is to provide a correction lens which can suppress to the minimum the possibility of wavy phosphor stripes being formed at the corner portions of the glass panel when the phosphor screen is formed by utilizing the exposure apparatus of the aforementioned type.

This object can be attained by disposing between the exposure light source and the glass panel a correction lens which is designed such that, when the light souce is observed from the individual slots of the shadow mask through the correction lens, the moving path of the light source in the case of a point light source or the axis of the light source in the case of a linear light source will in appearance extend substantially in parallel with the longitudinal center axis of the slot. Through the inventor's various experiments, such a lens having the above function could be found in lenses having a characteristic such that the light source located at a predetermined position along the optical axis of the correction lens can be observed from the side opposite to the light source in such a manner that the light source is in appearance displaced or approaches toward the lens by a certain constant distance on the optical axis independently of the observing or viewing positions.

According to the invention, there is provided a correction lens of an axially symmetrical configuration provided with a continuous curved surface having a minimum thickness at the center portion thereof and a maximum thickness in the radial intermediate portion between the center and the periphery and so designed that a light source located along the optical axis of the correction lens at one side thereof can be observed from the opposite side through the correction lens in such a manner that the light source is in appearance displaced toward the correction lens by a constant distance on the optical axis independently of observing angles.

Now the invention will be described with reference to the drawings.

Figure 4:
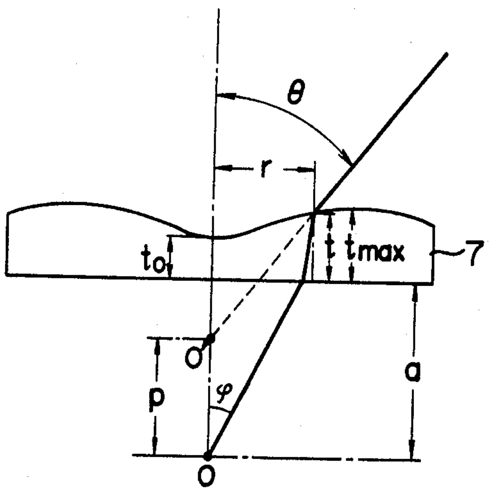
FIG. 4 illustrates the principle of the invention on the basis of which a correction lens is fabricated.

Referring to FIG. 4 illustrating the principle of designing the correction lens according to the invention, the correction lens 7 has a thin center portion in thickness $t_o$ and the thickest portion in thickness tmax in the radial intermediate portion between the center and the periphery of the lens. Of course, the lens 7 is formed axially symmetrically.

Now assuming in FIG. 4 that symbol $a$ represents the distance between a light source 0 and the lower surface of the lens 7, $p$ represents the displacement of the light source 0 toward the lens as viewed therethrough, $t$ represents the thickness of lens at a radius, $r$, N is the refraction index, $\phi$ is an angle at which the ray is emitted from the light source 0, and $\theta$ is an angle formed between the optical axis of the lens and light beam, there exist following relations among these parameters which can be derived from the law of refraction.

$$\frac{dt}{dr} = \frac{\sin\theta - \sin\phi}{\sqrt{N^2 - \sin^2\phi} - \cos\theta} \quad (1)$$

$$\tan\theta = \frac{r}{a - p + t} \quad (2)$$

$$r = \frac{a \cdot \tan\phi + \frac{t \cdot \tan\phi}{N}}{\sqrt{1 + (1 - \frac{1}{N^2})\tan^2\phi}} \quad (3)$$

when $\phi$ and $\theta$ are eliminated from the formulae (1) to (3), the relation between $t$ and $r$ can be expressed by an equation $t = F(r)$, whereby surface curvature can be determined. However, in practice, it is difficult to obtain the relation $t = F(r)$ by solving the formulae (1) to (3). This relation can be determined rather conveniently from numerical calculation.

Figure 5:
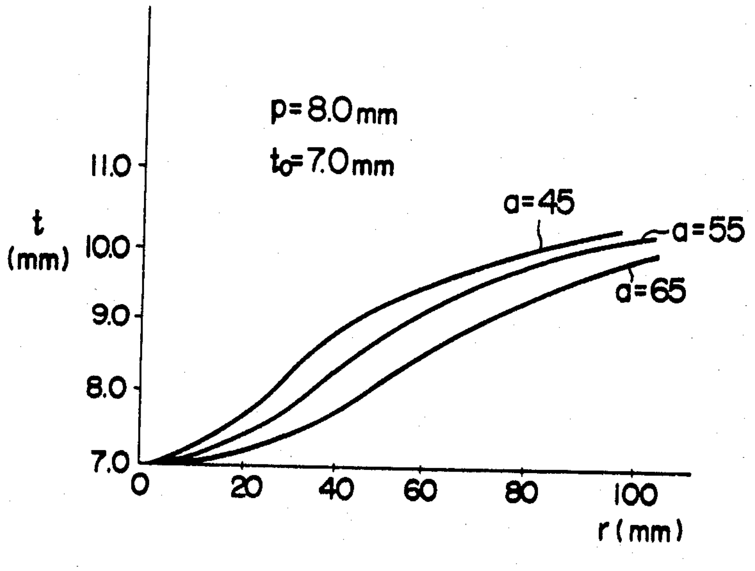
FIG. 5 is a graph illustrating the configuration of the curved surface of the lens according to the invention.

FIG. 5 graphically illustrates the relation between $t$ and $r$ with the value of $a$ being varied, while $p$ and $t_o$ are selected at 8.0 mm and 7.0 mm, respectively.

Figure 6:
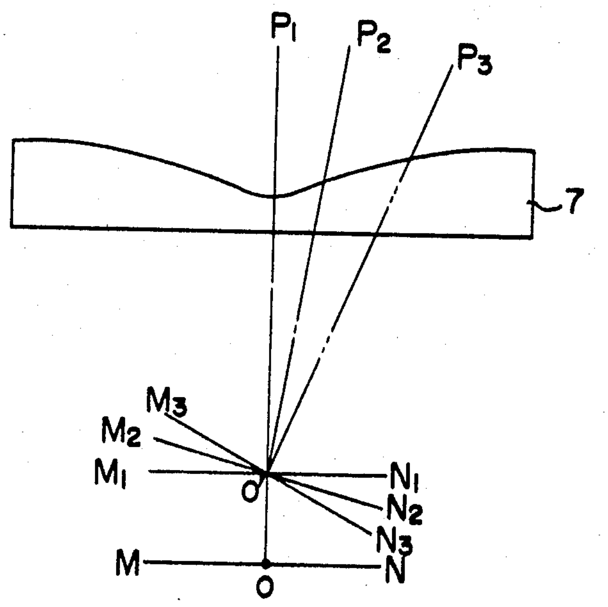
FIG. 6 illustrates effects of a correction lens according to the invention when used in the exposure process.

When the correction lens 7 of the above construction is employed in cooperation with a linear light source MN, as is shown in FIG. 6, the linear light source can be viewed through the lens as if it lies in inclined positions such as indicated by segments $M_1N_1$, $M_2N_2$ and $M_3N_3$ around a point O' displaced toward the lens from the actual position 0 of the light source for a displacement P along the optical axis in dependence of the viewing angles $P_1O'P_2$ and $P_1O'P_3$, when the light source MN is observed from the points $P_1$, $P_2$ and $P_3$ at the side of the lens opposite to the light source. The degree of the inclination can be varied by varying the parameters $a$, $t_o$ and (or) $p$. It has been found that the inclination of the optical image of the light source becomes greater, as $a$ and $p$ are selected smaller or $t_o$ is selected greater in the lens design. Due to such inclination of the light source image projected through the correction lens according to the invention, the linear light source and the slots of the shadow mask will extend substantially in parallel with each other in appearence, which thus provides an excellent compensation effect for eliminating the wavy form of the phosphor stripes upon the formation thereof at the corners of the glass panel. This applies also to the case in which the point source of light is employed. In this case, the linear moving path of the point light source is viewed in inclined positions in the aforementioned manner. It will thus be appreciated that a correction lens capable of suppressing remarkably the formation of wavy phosphor stripes by selecting parameters $a$, $p$ and $t_o$ at suitable values for a particular CRT in question. In a specific example in which the correction lens according to the invention is employed for manufacturing the phosphor screen of a 14 inch type color CRT with deflection angle of 90°, it has been found that the wave-like formation of the phosphor stripe at the corners of the screen can be reduced as much as about 75% as compared with the hitherto known exposure system.

In the above described embodiment, it is assumed that the correction lens has a flat lower surface. However, the invention is never restricted to such configuration of the lens. It is also possible to provide curved surfaces at both the upper and the lower sides of the correction lens. Further, a pair of correction lens such as shown in FIG. 4 may be employed with the lenses superposed on each other at the flat surfaces.

As hereinbefore described, the correction lens according to the invention has a characteristic that the light source located at a predetermined position along the optical axis of the correction lens can be observed from the side of the lens opposite to the light source in such a manner that the light source is in appearance displaced or approaches toward the correction lens by a certain constant distance or amount on the optical axis independently of the observing or viewing positions. This characteristic provides the following advantages. For the exposure of the light sensitive film on the inner surface of the glass panel of CRT, it is required to use a correction lens 5 for approximating the path of exposure ray to that of the electron beam as is shown in FIG. 1, which correction lens 5 is optically designed in respect of the light source located at a predetermined position along the optical axis. With such correction lens 5, the wavy formation of the phosphor stripes is inevitable for the reasons described hereinbefore. The correction lens 7 according to the invention can be employed together with the hitherto known correction lens 5 without necessity of modifying the latter for the purpose of suppressing the wavy formation of the phosphor stripes particularly at the corner portion of the phosphor screen by virtue of the unique characteristic described above.

As will be understood from the foregoing description, according to the invention, there has been provided a correction lens of an axially symmetrical configuration having a minimum thickness at the center portion and a maximum thickness in the radial intermediate portion between the center and the periphery of the lens. When a light source is located at a predetermined distance from the correction lens of such structure and viewed therethrough from the opposite side, the light source is observed as if it was displaced toward the lens by a certain constant distance on the optical axis of the lens independently of the viewing angles in inclined positions depending on the viewing angles as is illustrated in FIG. 6. Consequently, the slots of the shadow mask and the linear light source or the moving path of the point source of light will extend in appearance substantially in parallel with each other, whereby the wavy formation of the phosphor stripes at the formation of the phosphor screen can be significantly reduced.

What is claimed is:

1. A correction lens of an axially symmetrical configuration provided with a continuous curved surface having a minimum thickness at the center portion thereof and a maximum thickness in the radial intermediate portion between the center and the periphery and so designed that a light source located along the optical axis of said correction lens at one side thereof can be observed from the opposite side through said correction lens in such a manner that said light source is in appearance displaced toward said correction lens by a constant distance on the optical axis independently of observing angles, and in which thickness $t$ of said lens at a radial distance $r$ from the optical axis of said lens is given by following formulae:

$$\frac{dt}{dr} = \frac{\sin\theta - \sin\phi}{\sqrt{N^2 - \sin^2\phi} - \cos\theta}$$

$$\tan\theta = \frac{r}{a - p + t}$$

-continued $$r = a \cdot \tan\phi + \frac{\frac{t \cdot \tan\phi}{N}}{\sqrt{1 + (1 - \frac{1}{N^2})\tan^2\phi}}$$

wherein $a$ is distance between said light source and the surface of said lens facing said light source along the optical axis of said lens, $p$ is a displacement in appearance of said light source toward said lens, N is refraction index of said lens, $\phi$ is angle at which light ray is emitted from said light source and $\theta$ is an angle between said optical axis and the light ray leaving said lens.

* * * * *